(12) United States Patent
Fujii et al.

(10) Patent No.: US 8,779,641 B2
(45) Date of Patent: *Jul. 15, 2014

(54) MOTOR INCLUDING BUSBAR HOLDER AND BUSBARS

(75) Inventors: Yoshio Fujii, Kyoto (JP); Hisashi Fujihara, Kyoto (JP); Kenichiro Hamagishi, Kyoto (JP); Yosuke Yamada, Kyoto (JP)

(73) Assignee: Nidec Corporation, Kyoto (JP)

( * ) Notice: Subject to any disclaimer, the term of this patent is extended or adjusted under 35 U.S.C. 154(b) by 304 days.

This patent is subject to a terminal disclaimer.

(21) Appl. No.: 12/921,783

(22) PCT Filed: Mar. 12, 2009

(86) PCT No.: PCT/JP2009/054798
§ 371 (c)(1),
(2), (4) Date: Sep. 10, 2010

(87) PCT Pub. No.: WO2009/113632
PCT Pub. Date: Sep. 17, 2009

(65) Prior Publication Data
US 2011/0001388 A1 Jan. 6, 2011

(30) Foreign Application Priority Data
Mar. 13, 2008 (JP) .................................. 2008-063626

(51) Int. Cl.
*H02K 11/00* (2006.01)
(52) U.S. Cl.
USPC .......................................... 310/71; 310/68 B

(58) Field of Classification Search
USPC .................................................. 310/71, 68 B
IPC ........................... H02K 11/00,3/50; H01R 4/18
See application file for complete search history.

(56) References Cited

U.S. PATENT DOCUMENTS 6,429,556 B1 * 8/2002 Nakamura et al. .............. 310/71
6,483,296 B1 11/2002 Hamaoka et al.
(Continued)

FOREIGN PATENT DOCUMENTS

| JP | 11-114674 A | 4/1999 | |
| JP | 11234940 A * | 8/1999 | ............... H02K 3/50 |

(Continued)

OTHER PUBLICATIONS

Machine Translation, Nakada et al., JP 11234940 A, Aug. 27, 1999.*

(Continued)

*Primary Examiner* — John K Kim
*Assistant Examiner* — Thomas Truong
(74) *Attorney, Agent, or Firm* — Keating & Bennett, LLP

(57) ABSTRACT

In a busbar unit, which is a distributing device arranged to supply electrical currents to coils, a busbar holder is arranged to support coil connection busbars and sensor connection busbars. Conductor wire connection portions of the coil connection busbars are exposed on both axial sides and welded to a conductor wire defining the coils. The sensor connection busbars are combined with a plurality of electronic components to define a Hall IC circuit designed to output and receive electrical signals to or from Hall ICs. Sensor connection portions of the sensor connection busbars are exposed on both axial sides, and welded to terminals of the Hall ICs. Electronic component connection portions of the sensor connection busbars are exposed on both axial sides, and welded to the electronic components.

17 Claims, 14 Drawing Sheets

(56) References Cited

U.S. PATENT DOCUMENTS

| | | | |
|---|---|---|---|
| 6,577,029 B1* | 6/2003 | Weber et al. | 310/68 R |
| 6,703,749 B2* | 3/2004 | Kuroyanagi | 310/180 |
| 6,855,409 B1 | 2/2005 | Urushizaki et al. | |
| 6,914,356 B2* | 7/2005 | Yamamura et al. | 310/71 |
| 6,930,418 B2* | 8/2005 | Kobayashi et al. | 310/71 |
| 2002/0056601 A1 | 5/2002 | Inoue | |
| 2003/0173842 A1* | 9/2003 | Kobayashi et al. | 310/71 |
| 2006/0068617 A1* | 3/2006 | Migita et al. | 310/71 |
| 2006/0125334 A1* | 6/2006 | Kataoka et al. | 310/68 B |
| 2006/0138883 A1* | 6/2006 | Yagai et al. | 310/71 |
| 2006/0208586 A1* | 9/2006 | Guttenberger | 310/71 |
| 2007/0178723 A1* | 8/2007 | Kataoka et al. | 310/71 |
| 2007/0273221 A1* | 11/2007 | Kinoshita et al. | 310/58 |
| 2007/0278876 A1* | 12/2007 | Haga et al. | 310/71 |

FOREIGN PATENT DOCUMENTS

| | | | |
|---|---|---|---|
| JP | 2000-201417 A | | 7/2000 |
| JP | 2001-59702 A | | 3/2001 |
| JP | 2002-147496 A | | 5/2002 |
| JP | 2003-020961 A | | 1/2003 |
| JP | 2004-313000 A | | 11/2004 |
| JP | 2007-187262 A | | 7/2007 |
| JP | 2007-221976 A | | 8/2007 |
| JP | 2008187779 A | * | 8/2008 |

OTHER PUBLICATIONS

Machine Translation, Yamamoto et al., JP 2008187779 A, Aug. 14, 2008.*

English Language Translation of Official Communication issued in corresponding International Application No. PCT/JP2009/054798, mailed on Nov. 2, 2010.

Official Communication issued in International Patent Application No. PCT/JP2009/054798, mailed on May 26, 2009.

Fujii et al., "Motor", U.S. Appl. No. 12/921,781, filed Sep. 10, 2010.

* cited by examiner

MOTOR INCLUDING BUSBAR HOLDER AND BUSBARS

BACKGROUND OF THE INVENTION

1. Field of the Invention

The present invention relates to a motor.

2. Description of the Related Art

Brushless motors have been installed in a variety of devices, including, for example, vehicle transmissions. JP-A 2007-187262, for example, discloses a conventional brushless motor installed in a transmission of a vehicle.

An electric actuator disclosed in JP-A 2007-187262 includes an electric motor (a brushless motor) and a ball screw mechanism arranged within a rotor magnet and defining a portion of the electric motor. The electric motor is arranged to rotate based on instructions received from a control system (e.g., an ECU) of the vehicle. The ball screw mechanism is arranged to convert a rotational motion of the rotor magnet into a straight linear motion. Since the ball screw mechanism is arranged within the rotor magnet, noise that accompanies the converting operation of the ball screw mechanism is kept within the electric motor.

As described above, the conventional brushless motor disclosed in JP-A 2007-187262 is used in the vehicle, such as an automobile, and is required to operate stably under a variety of environments. A gear shift device installed in the transmission, for example, will often increase in temperature up to more than one hundred and ten degrees centigrade due to heat generated in an engine, frictional heat generated in the gear shift device, and the like. Therefore, a brushless motor installed in the gear shift device is required to operate stably under the aforementioned high temperature environment.

However, in the case of a brushless motor in which end portions of conductor wires defining coils are connected with busbars with solder, the aforementioned high temperature environment may cause the solder connecting the coils to the busbars to be melted. This will cause the brushless motor to be inoperative, leading to impaired reliability of the brushless motor.

SUMMARY OF THE INVENTION

A motor according to a preferred embodiment of the present invention is used to select a gear of a transmission installed in a vehicle, or to drive a clutch, and preferably includes a rotor, a stator core, a plurality of coils, and a busbar unit. The busbar unit includes a busbar holder and a plurality of coil connection busbars. The busbar holder is made of an insulating material and arranged to support the plurality of coil connection busbars. Each of the plurality of coil connection busbars includes a conductor wire connection portion connected with an end portion of a conductor wire defining the coils by welding.

A motor according to another preferred embodiment of the present invention preferably includes a rotor, a stator core, a plurality of coils, and a busbar unit. The busbar unit includes a busbar holder and a plurality of coil connection busbars. The busbar holder is made of an insulating material and arranged to support the plurality of coil connection busbars. Each of the plurality of coil connection busbars includes a conductor wire connection portion connected with an end portion of a conductor wire defining the coils. Each conductor wire connection portion is in the shape of letter "U" with a groove extending in an axial direction defined therein, and has a cutout portion defined in a portion of a side surface thereof.

The preferred embodiments of the present invention enable the motor to operate stably even when in a high temperature environment, since the electrical connection between each coil connection busbar and the corresponding end portion of the conductor wire will not become poor as a result of high temperatures. Moreover, the welding can be achieved efficiently because of a reduction in an area of contact between each conductor wire connection portion and the corresponding end portion of the conductor wire.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
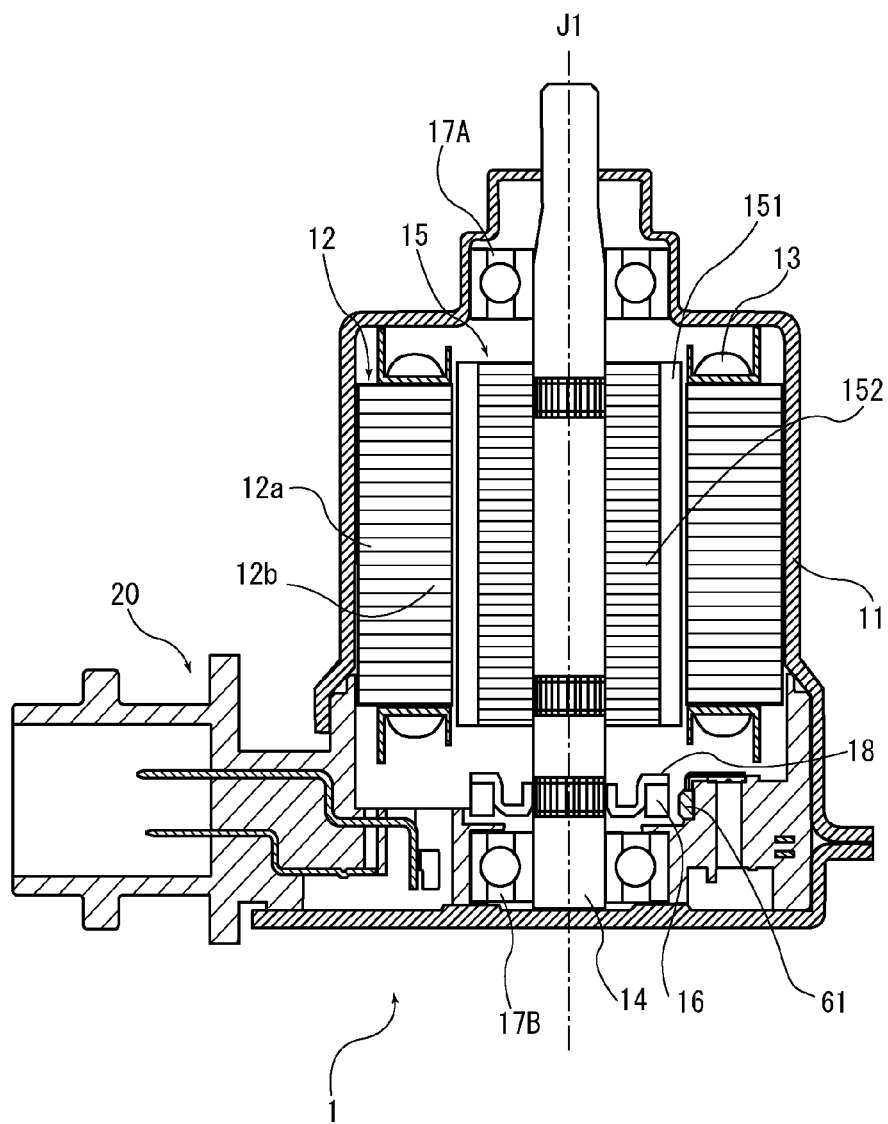
FIG. 1 is a cross-sectional view of a motor according to a preferred embodiment of the present invention.

Hereinafter, preferred embodiments of the present invention will be described with reference to the accompanying drawings. FIG. 1 is a side cross-sectional view of a brushless motor 1 according to the present preferred embodiment. The brushless motor 1 illustrated in FIG. 1 preferably includes a housing 11, a stator core 12, coils 13, a shaft 14, a rotor 15, a sensor magnet 16, and a busbar unit 20. The brushless motor 1 is used, for example, to select a gear of a transmission installed in a vehicle, or to drive a clutch. The brushless motor 1 is driven through an electrical current supplied from a power supply unit (not shown), such as, for example, a battery, through a control unit (not shown), such as, for example, an ECU.

The brushless motor 1 may be installed in an apparatus in various manners depending on the apparatus, and also may be arranged in various orientations. Therefore, no absolute upward/downward directions exist for the brushless motor 1. However, for the sake of convenience, it is assumed in the following description that upward/downward directions in FIG. 1 are upward/downward directions of the brushless motor 1.

Figure 16:
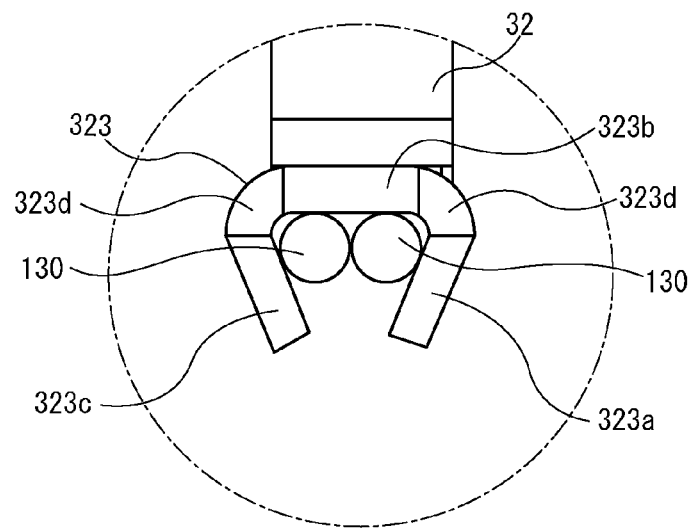
FIG. 16 is a diagram illustrating the state of a conductor wire connection portion and end portions of a conductor wire according to a preferred embodiment of the present invention prior to welding.
Figure 17:
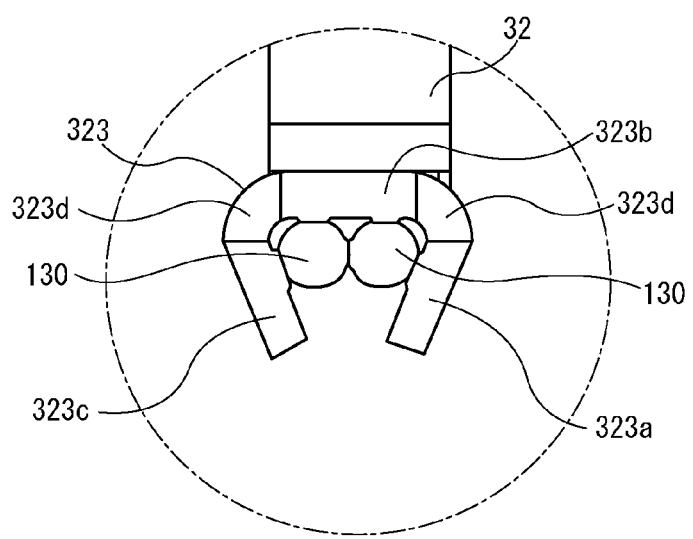
FIG. 17 is a diagram illustrating the state of the conductor wire connection portion and the end portions of the conductor wire according to a preferred embodiment of the present invention after the welding.

The housing 11 preferably has a substantially cylindrical shape and centered on a rotation axis J1 of the brushless motor 1. The stator core 12 is fixed to an inner circumferential surface of the housing 11. The stator core 12 includes a core back portion 12a and a plurality of tooth portions 12b. The core back portion 12a preferably is substantially annular and centered on the rotation axis J1. The tooth portions 12b are arranged to extend radially from the core back portion 12a toward the rotation axis J1. A conductor wire 130, ends of which are shown in FIGS. 16 and 17, is wound around each of the tooth portions 12b to define the coils 13.

In addition, ball bearings 17A and 17B are held in an upper portion of the housing 11 and a lower portion of the busbar unit 20, respectively. The shaft 14, which is centered on the rotation axis J1, is rotatably supported by the ball bearings 17A and 17B.

The rotor 15 preferably includes a rotor magnet 151 and a rotor core 152, and is arranged to rotate integrally with the shaft 14. The rotor magnet 151 is fixed to an outer circumferential surface of the rotor core 152, which is fixed to the shaft 14. The sensor magnet 16 is arranged below the rotor 15, and held by a sensor yoke 18 fixed to the shaft 14.

The busbar unit 20 is arranged to cover a lower side of the stator core 12. The busbar unit 20 is a distributing device arranged to supply electrical currents to the coils 13. The busbar unit 20 preferably holds a plurality of Hall ICs 61 such that the Hall ICs 61 are arranged radially outwardly opposite the sensor magnet 16.

In the brushless motor 1 having the above-described structure, electrical currents are supplied from the power supply unit to the coils 13 through the control unit in accordance with the rotational position of the rotor magnet 151. A magnetic field is generated upon energization of the coils 13 and works to rotate the rotor magnet 151. The brushless motor 1 is arranged to obtain a rotational driving force in the above-described manner.

Figure 2:
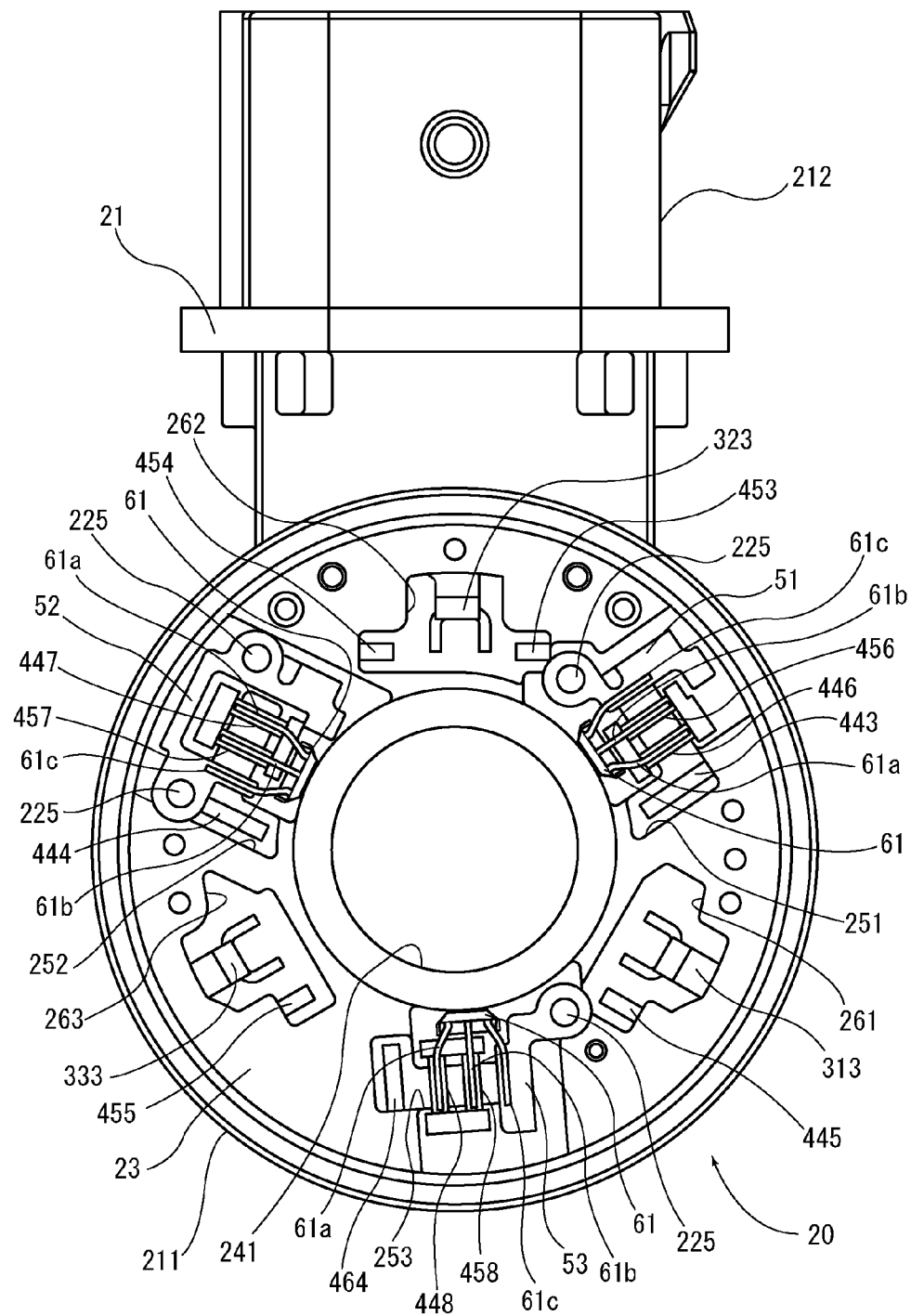
FIG. 2 is a top view of a busbar unit of a motor according to a preferred embodiment of the present invention.
Figure 3:
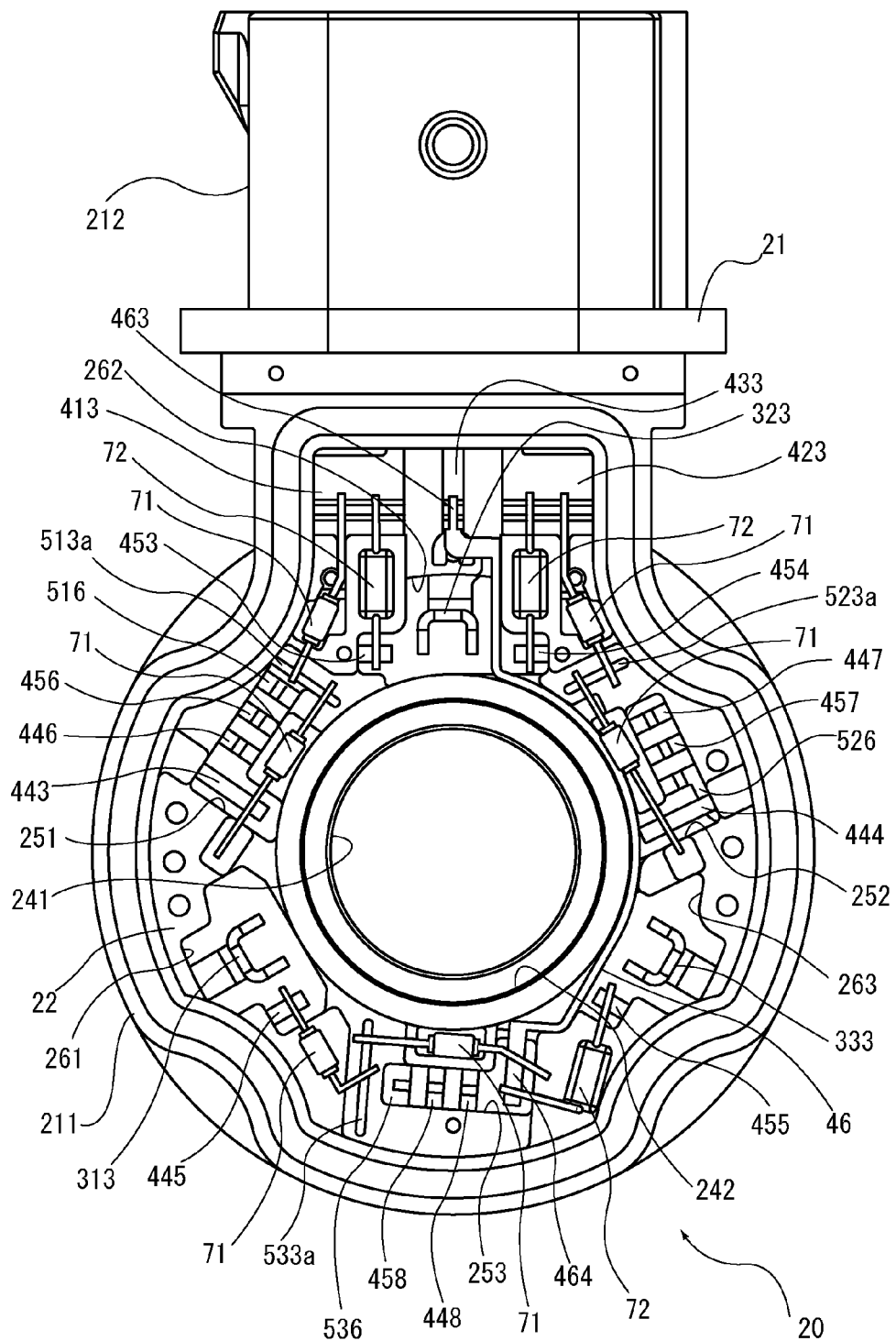
FIG. 3 is a bottom view of the busbar unit of a motor according to a preferred embodiment of the present invention.
Figure 4:
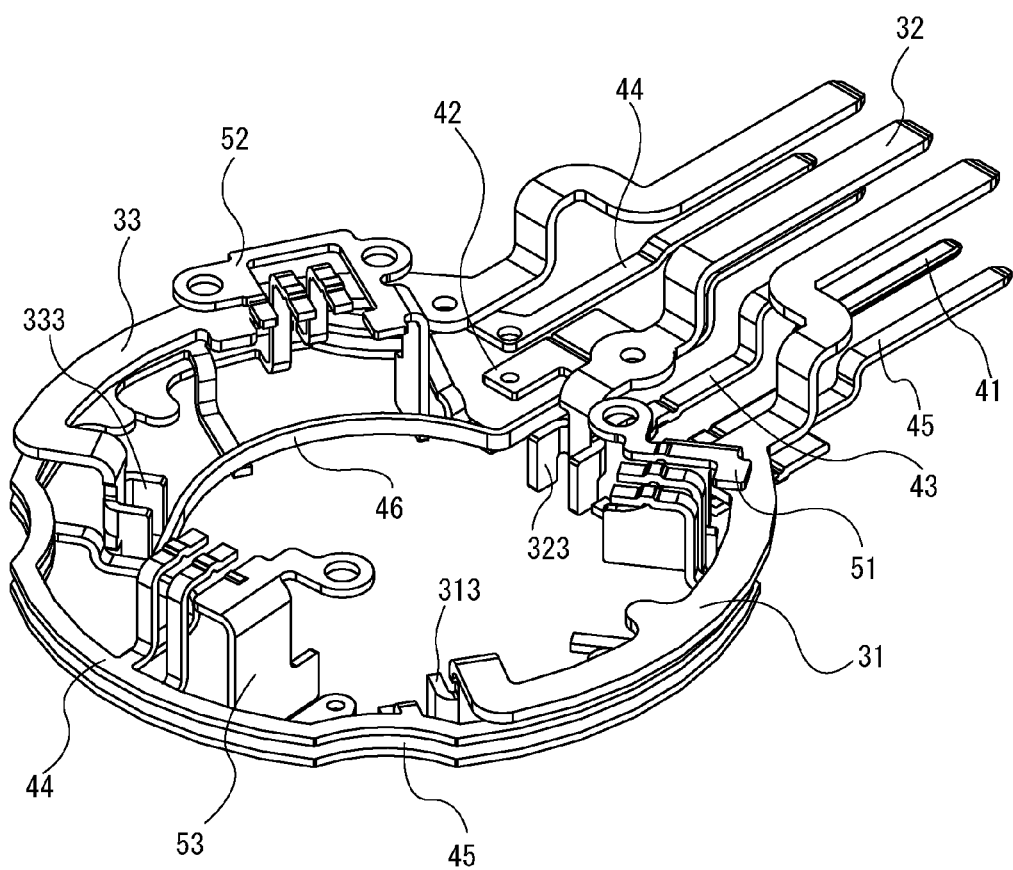
FIG. 4 is a diagram illustrating an arrangement of various busbars defining a portion of the busbar unit of a motor according to a preferred embodiment of the present invention.

FIG. 2 is a top view of the busbar unit 20 that illustrates the busbar unit 20 as viewed from the direction of the stator core 12. FIG. 3 is a bottom view of the busbar unit 20. FIG. 4 illustrates an arrangement of various busbars defining a portion of the busbar unit 20. Note that, in FIG. 4, a busbar holder 21 and so on are omitted from illustration. In FIG. 4, the upper side (i.e., the side on which the stator core 12 is arranged) is a side on which coil connection busbars 31, 32, and 33 are arranged, while the lower side is a side on which a sensor connection busbar 45 is arranged.

As illustrated in FIGS. 2 to 4, the busbar unit 20 includes the busbar holder 21, the plurality of Hall ICs 61, a plurality of coil connection busbars, a plurality of sensor connection busbars, and a plurality of electronic components. The busbar holder 21 is made of an insulating material, and includes a busbar holder body portion 211 and a connector portion 212. The busbar holder body portion 211 is substantially circular in plan view. The connector portion 212 is arranged radially outward of the busbar holder body portion 211.

As illustrated in FIG. 2, each Hall IC 61 is arranged on an upper surface portion 23 of the busbar holder body portion 211 to output a Hall signal in accordance with the position of the sensor magnet 16. Each Hall IC 61 includes a power supply terminal 61a used for power input, a ground terminal 61b used for grounding, and an output terminal 61c used to output the Hall signal.

Also, referring to FIG. 4, the plurality of coil connection busbars and the plurality of sensor connection busbars are supported by the busbar holder 21.

The coil connection busbars 31, 32, and 33 are electrically conductive members arranged to supply three-phase electrical currents to the coils 13. Sensor connection busbars 41, 42, 43, 46, 51, 52, and 53 are electrically conductive members used to output, to the control unit, the Hall signals outputted from the Hall ICs 61. A sensor connection busbar 44 is an electrically conductive member used to supply power to each Hall IC 61. The sensor connection busbar 45 is an electrically conductive member used to ground each Hall IC 61.

Also, as illustrated in FIG. 3, as the plurality of electronic components, a plurality of resistors 71 and a plurality of capacitors 72 are arranged on a bottom surface portion 22 of the busbar holder body portion 211.

The plurality of sensor connection busbars, the plurality of resistors 71, and the plurality of capacitors 72 together define a Hall IC circuit. The Hall IC circuit is a circuit designed to supply power to each Hall IC 61, and output to the control unit the Hall signals outputted from the Hall ICs 61. The Hall IC circuit is designed in accordance with the number of Hall ICs 61 arranged on the busbar unit 20.

Figure 5:
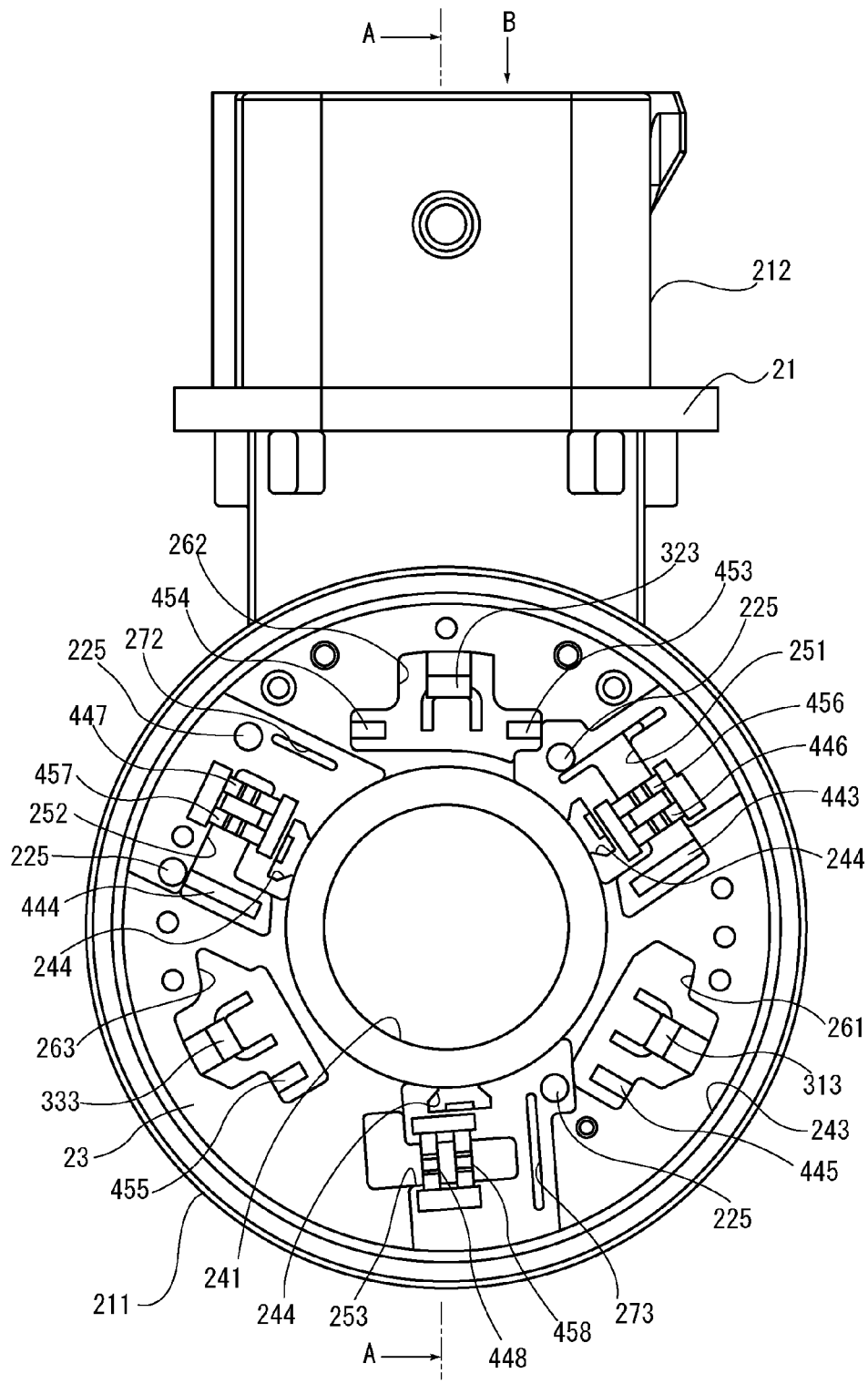
FIG. 5 is a top view of a busbar holder according to a preferred embodiment of the present invention.
Figure 6:
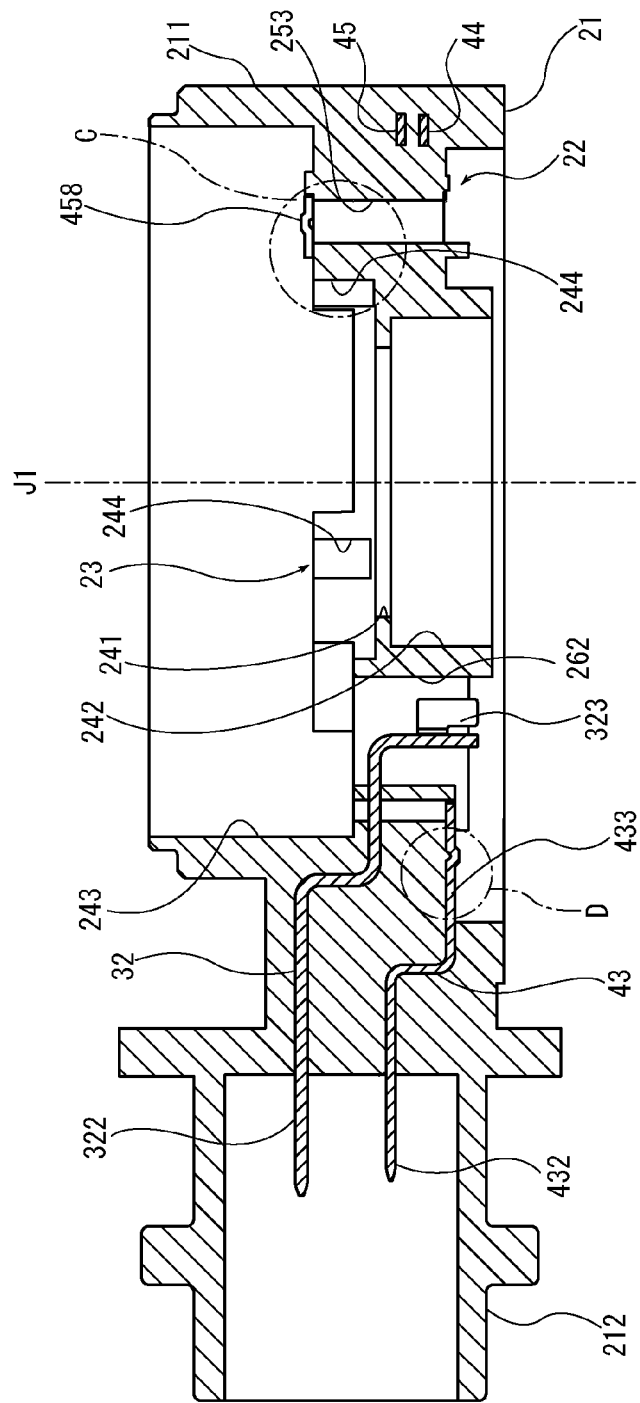
FIG. 6 is a cross-sectional view of the busbar holder taken along arrowed line A-A in FIG. 5.
Figure 7:
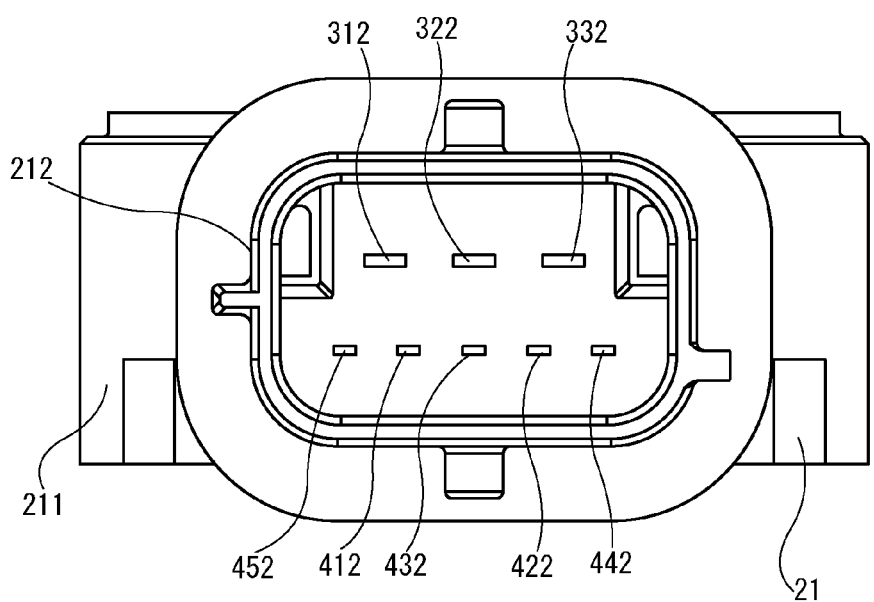
FIG. 7 is a side view of the busbar holder when viewed from a direction indicated by arrow B in FIG. 5.

FIG. 5 is a top view of the busbar holder 21. FIG. 6 is a cross-sectional view of the busbar holder 21 taken along arrowed line A-A in FIG. 5. FIG. 7 is a side view of the busbar holder 21 when viewed from a direction indicated by arrow B in FIG. 5.

As illustrated in FIGS. 5 and 6, the coil connection busbars 31, 32, and 33 and the sensor connection busbars 41, 42, 43, 44, and 45 are partially buried in the busbar holder 21. The busbar holder 21, the coil connection busbars 31, 32, and 33, and the sensor connection busbars 41, 42, 43, 44, and 45 are formed integrally by, for example, insert molding.

The busbar holder body portion 211 has a center hole 241 which is substantially circular and centered on the rotation axis J1. The shaft 14 is inserted through the center hole 241. The bottom surface portion 22 of the busbar holder body portion 211 has a bearing holder 242 defined therein so as to surround the center hole 241. The bearing holder 242 defines a hole opening downward in the busbar holder body portion 211, and is arranged to hold the ball bearing 17B.

The busbar holder body portion 211 has an opening hole 243 defined above it, and a bottom surface of the opening hole 243 defines the upper surface portion 23 of the busbar holder body portion 211. The upper surface portion 23 has a plurality of sensor holders defined therein which are arranged to hold the Hall ICs 61. Each sensor holder 244 is arranged radially outwardly opposite the sensor magnet 16.

Also, the busbar holder body portion 211 has a plurality of through holes defined therein which extend axially from the bottom surface portion 22 to the upper surface portion 23, in addition to the center hole 241.

As illustrated in FIGS. 6 and 7, the connector portion 212 is substantially tubular in shape with a radially outward opening. At the connector portion 212, terminal portions 312, 322, and 332 of the coil connection busbars 31, 32, and 33, respectively, and terminal portions 412, 422, 432, 442, and 452 of the sensor connection busbars 41, 42, 43, 44, and 45, respectively, are arranged to project radially outward from the busbar body portion 211. Each of the terminal portions serves as a connector pin arranged to connect to the control unit arranged outside the brushless motor 1.

Figure 8:
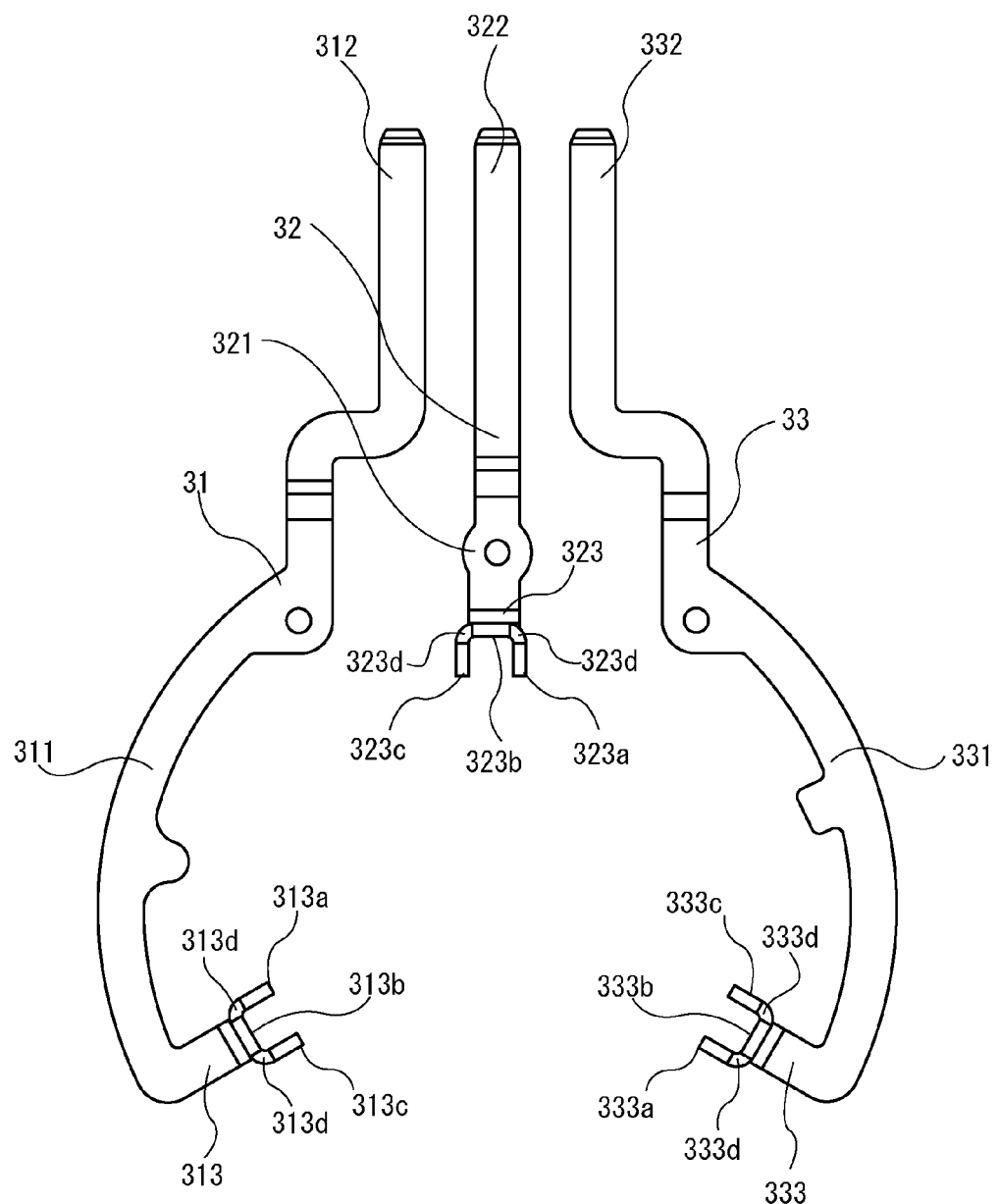
FIG. 8 is a bottom view of coil connection busbars according to a preferred embodiment of the present invention.

FIG. 8 is a bottom view of the coil connection busbars 31, 32, and 33. In other words, FIG. 8 illustrates the coil connection busbars 31, 32, and 33 as extracted from the bottom view of the busbar unit 20 of FIG. 3.

In the coil connection busbar 31, the terminal portion 312 is arranged to extend radially outward from a base portion 311 substantially in the shape of a circular arc, and a conductor wire connection portion 313 is arranged radially inside the base portion 311. The coil connection busbar 32 is substantially in the shape of a straight line. In the coil connection busbar 32, the terminal portion 322 is arranged to extend radially outward from a base portion 321, and a conductor wire connection portion 323 is arranged radially inside the base portion 321. In the coil connection busbar 33, the terminal portion 332 is arranged to extend radially outward from a base portion 331 substantially in the shape of a circular arc, and a conductor wire connection portion 333 is arranged radially inside the base portion 331. The base portions 311, 321, and 331 are buried in the busbar holder body portion 211.

As illustrated in FIG. 4, the conductor wire connection portions 313, 323, and 333 are arranged to extend radially inward from the base portions 311, 321, and 331, respectively, and thereafter be bent downward. Each of the conductor wire connection portions 313, 323, and 333 has defined therein a groove extending along the axial direction. Also, as illustrated in FIGS. 2, 3, and 5, the conductor wire connection portions 313, 323, and 333 are arranged to project radially inward from inner surfaces of through holes 261, 262, 263, respectively, and be exposed on both axial sides of the busbar holder 21. Each of the conductor wire connection portions 313, 323, and 333 is connected with two end portions of the conductor wire 130 defining the coils 13. This is because the coils 13 of the brushless motor 1 are connected in a delta configuration.

Figure 9:
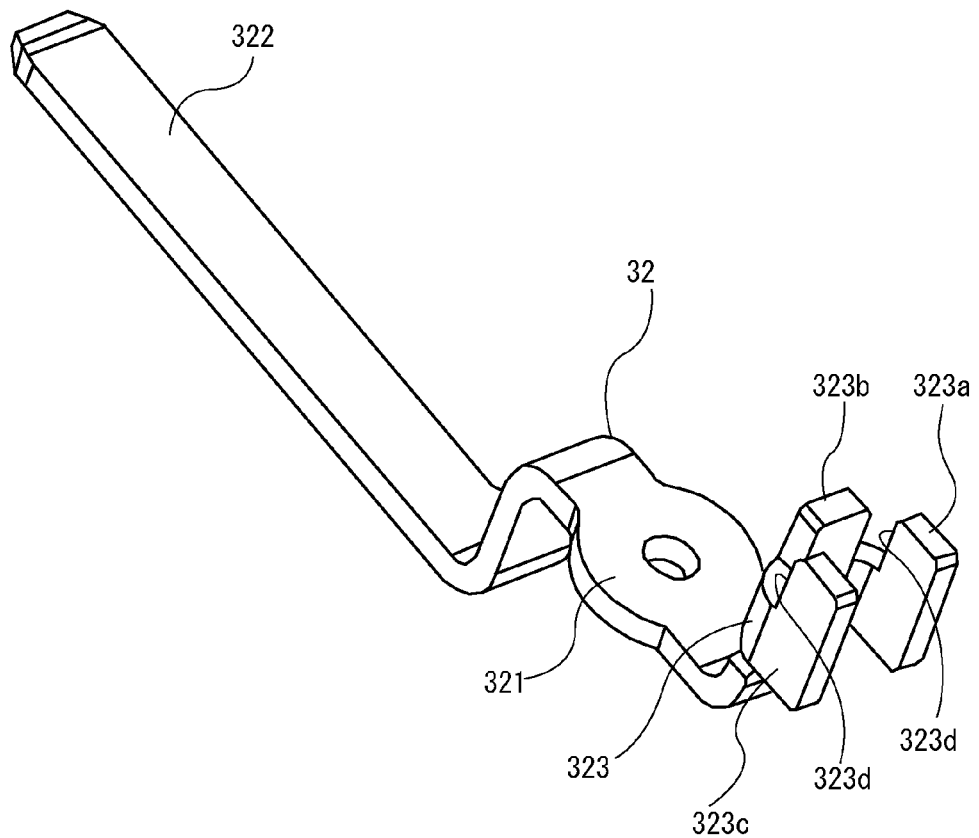
FIG. 9 is a perspective view of one of the coil connection busbars according to a preferred embodiment of the present invention.

FIG. 9 is a perspective view of the coil connection busbar 32. As illustrated in FIG. 9, the conductor wire connection portion 323 includes side wall portions 323a, 323b, and 323c arranged to substantially assume the shape of the letter "U". Cutout portions 323d extending along the axial direction are defined between the side wall portions 323a and 323b and between the side wall portions 323b and 323c.

Similarly, regarding the conductor wire connection portion 313, cutout portions 313d are defined between side wall portions 313a and 313b and between side wall portions 313b and 313c. Also, regarding the conductor wire connection portion 333, cutout portions 333d are defined between side wall portions 333a and 333b and between side wall portions 333b and 333c.

Figure 10:
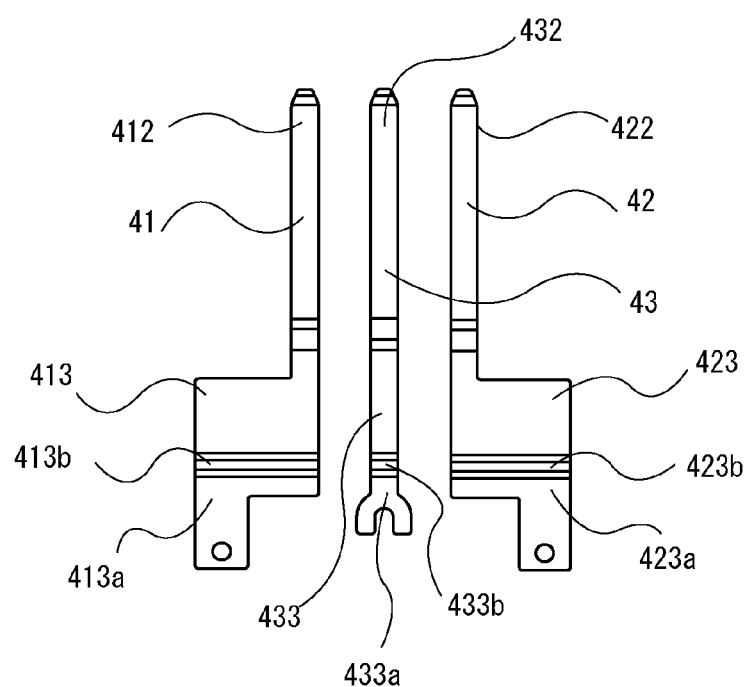
FIG. 10 is a bottom view of sensor connection busbars according to a preferred embodiment of the present invention.

FIG. 10 is a bottom view of the sensor connection busbars 41, 42, and 43. In other words, FIG. 10 illustrates the sensor connection busbars 41, 42, and 43 as extracted from the bottom view of the busbar unit 20 illustrated in FIG. 3.

The sensor connection busbar 41 includes the terminal portion 412 and an electronic component connection portion 413. The sensor connection busbar 42 includes the terminal portion 422 and an electronic component connection portion 423. The sensor connection busbar 43 includes the terminal portion 432 and an electronic component connection portion 433.

The terminal portions 412, 422, and 432 are arranged to extend radially outward from the electronic component connection portions 413, 423, and 433, respectively. The electronic component connection portions 413, 423, and 433 are each in the shape of a plane, including plane portions 413a, 423a, and 433a, respectively, which are perpendicular or substantially perpendicular to the axial direction. As illustrated in FIG. 3, the electronic component connection portions 413, 423, and 433 are arranged on the bottom surface portion 22 of the busbar holder body portion 211, and exposed on the lower side of the busbar holder 21.

Figure 19:
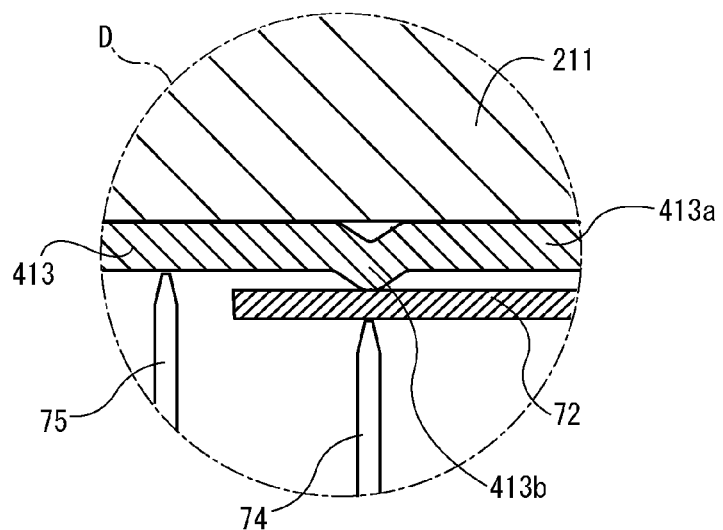
FIG. 19 is a diagram illustrating the state of an electronic component connection portion and an end portion of a capacitor according to a preferred embodiment of the present invention prior to welding.

The electronic component connection portion 413 includes a projection portion 413b raised downward from the plane portion 413a (see FIG. 19). The electronic component connection portion 413 is connected with one of the resistors 71 and one of the capacitors 72 at the projection portion 413b. Similarly, the electronic component connection portion 423 is connected with one of the resistors 71 and one of the capacitors 72 at a projection portion 423b. The electronic component connection portion 433 is connected with an electronic component connection portion 463 of the sensor connection busbar 46 at a projection portion 433b.

Figure 11:
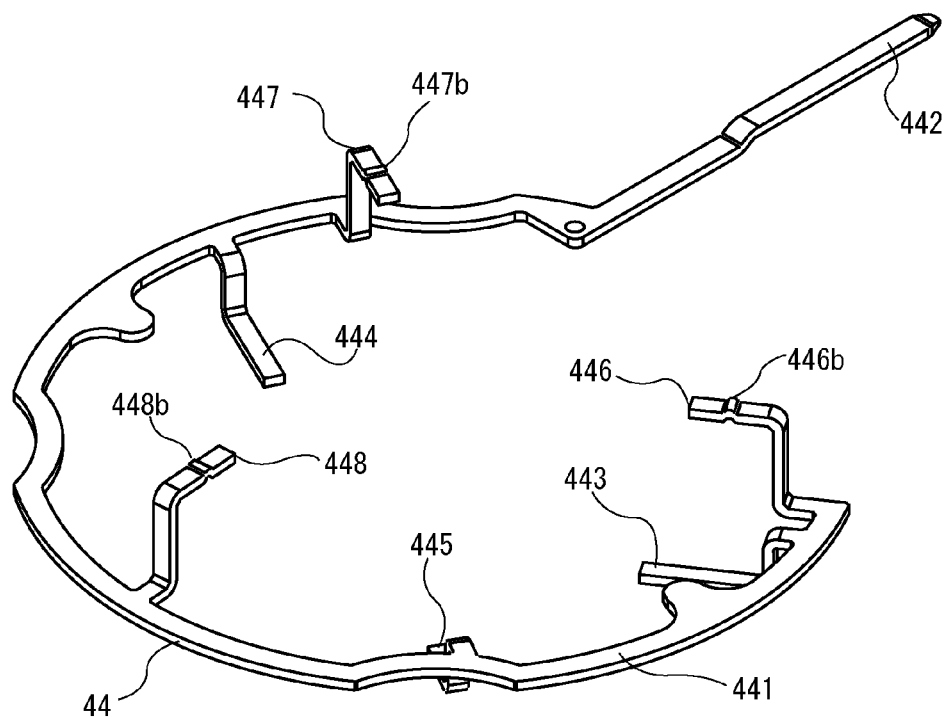
FIG. 11 is a perspective view of a sensor connection busbar according to a preferred embodiment of the present invention that is arranged to supply power to Hall ICs.

FIG. 11 is a perspective view of the sensor connection busbar 44. The sensor connection busbar 44 is substantially in the shape of a circular arc, in accord with the shape of the busbar holder body portion 211. The terminal portion 442 is arranged to extend radially outward from a circular arc portion 441.

Electronic component connection portions 443, 444, and 445 are arranged to project radially inward and downward from the circular arc portion 441. As illustrated in FIGS. 3 and 5, the electronic component connection portions 443, 444, and 445 are arranged to project radially inward from inner surfaces of through holes 251, 252, and 261, respectively, and are exposed on both axial sides of the busbar holder 21. Each of the electronic component connection portions 443, 444, and 445 is connected with one of the resistors 71.

Sensor connection portions 446, 447, and 448 are arranged to project radially inward and upward from the circular arc portion 441. The sensor connection portions 446, 447, and 448 have projection portions 446b, 447b, and 448b raised axially, respectively. As illustrated in FIGS. 2 and 5, the sensor connection portions 446, 447, and 448 are arranged to project radially inward from the inner surfaces of the through holes 251, 252, and 253, respectively, and are exposed on both axial sides of the busbar holder 21. Each of the projection portions 446b, 447b, and 448b is connected with the power supply terminal 61a.

Figure 12:
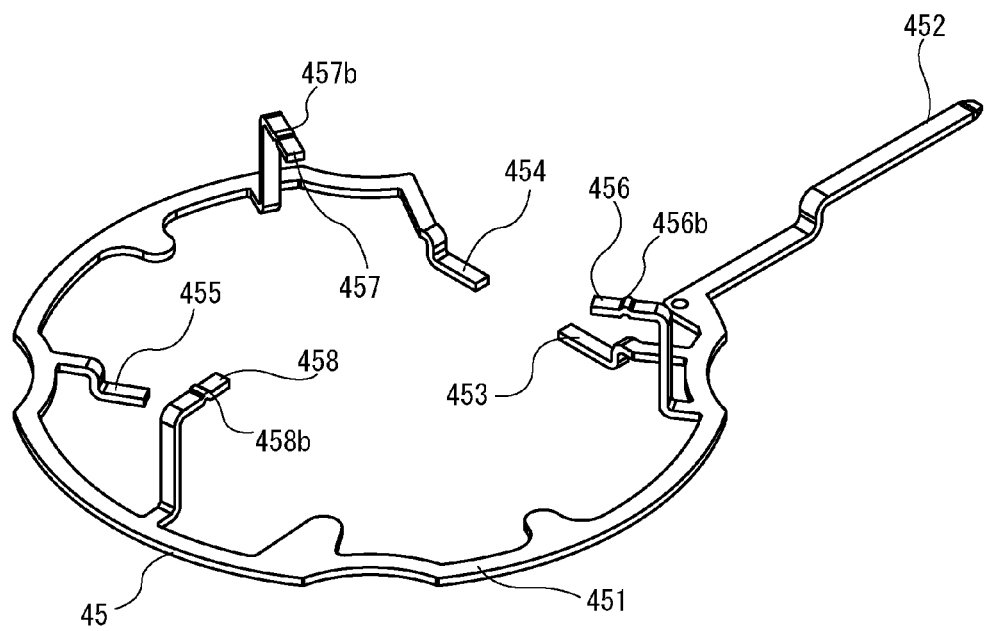
FIG. 12 is a perspective view of a sensor connection busbar according to a preferred embodiment of the present invention that is arranged to ground the Hall ICs.

FIG. 12 is a perspective view of the sensor connection busbar 45. The sensor connection busbar 45 is substantially in the shape of a circular arc, in accord with the shape of the busbar holder body portion 211. The terminal portion 452 is arranged to extend radially outward from a circular arc portion 451.

Electronic component connection portions 453, 454, and 455 are arranged to project radially inward and downward from the circular arc portion 451. As illustrated in FIGS. 3 and 5, the electronic component connection portions 453, 454, and 455 are arranged to project from the inner surfaces of the through holes 262, 262, and 263, respectively, and are exposed on both axial sides of the busbar holder 21. Each of the electronic component connection portions 453, 454, and 455 is connected with one of the capacitors 72.

Sensor connection portions 456, 457, and 458 are arranged to project radially inward and upward from the circular arc portion 451. The sensor connection portions 456, 457, and 458 have projection portions 456b, 457b, and 458b raised axially, respectively. As illustrated in FIGS. 2 and 5, the sensor connection portions 456, 457, and 458 are arranged to project radially inward from the inner surfaces of the through holes 251, 252, and 253, respectively, and are exposed on both axial sides of the busbar holder 21. Each of the projection portions 456b, 457b, and 458b is connected with the ground terminal 61b.

Figure 13:
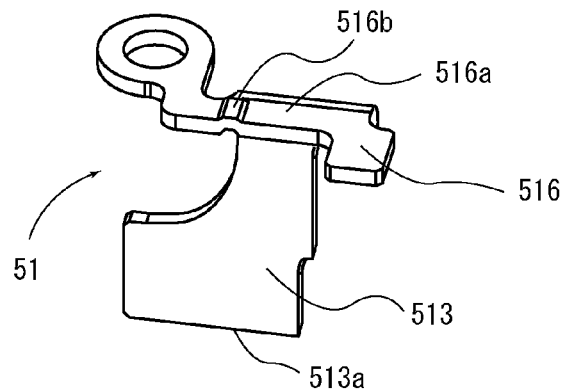
FIG. 13 is a perspective view of a sensor connection busbar according to a preferred embodiment of the present invention that is arranged to be connected with an output terminal of one of the Hall ICs.
Figure 14:
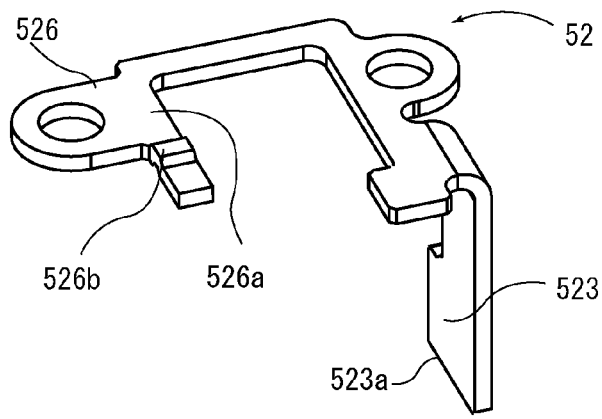
FIG. 14 is a perspective view of a sensor connection busbar according to a preferred embodiment of the present invention that is arranged to be connected with an output terminal of one of the Hall ICs.
Figure 15:
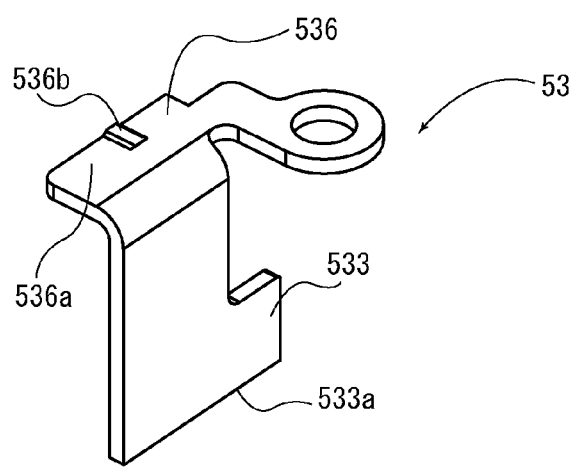
FIG. 15 is a perspective view of a sensor connection busbar according to a preferred embodiment of the present invention that is arranged to be connected with an output terminal of one of the Hall ICs.

FIG. 13 is a perspective view of the sensor connection busbar 51. FIG. 14 is a perspective view of the sensor connection busbar 52. FIG. 15 is a perspective view of the sensor connection busbar 53.

As illustrated in FIG. 13, the sensor connection busbar 51 includes an electronic component connection portion 513 and a sensor connection portion 516. The electronic component connection portion 513 is inserted into the through hole 251 (see FIG. 5) from above. Accordingly, a top end 513a of the electronic component connection portion 513 is arranged to project from the bottom surface portion 22 to be connected with two of the resistors 71. The sensor connection portion 516 has a projection portion 516b raised upward from a plane portion 516a. The projection portion 516b is connected with the output terminal 61c.

Similarly, an electronic component connection portion 523 of the sensor connection busbar 52 illustrated in FIG. 14 is inserted into a through hole 272 (see FIG. 5) from above. A top end 523a of the electronic component connection portion 523 arranged to project from the bottom surface portion 22 is connected with two of the resistors 71. A sensor connection portion 526 has a projection portion 526b raised upward from a plane portion 526a. The projection portion 526b is connected with the output terminal 61c.

An electronic component connection portion 533 of the sensor connection busbar 53 illustrated in FIG. 15 is inserted into a through hole 273 (see FIG. 5) from above. A top end 533a of the electronic component connection portion 533 arranged to project from the bottom surface portion 22 is connected with two of the resistors 71. A sensor connection portion 536 has a projection portion 536b raised upward from a plane portion 536a. The projection portion 536b is connected with the output terminal 61c.

As illustrated in FIG. 3, the sensor connection busbar is an electrically conductive member preferably having a substantially circular arc shape. The sensor connection busbar is arranged as an extension cable to connect one of the resistors 71 and one of the capacitors 72 to the sensor connection busbar 43 positioned on an opposite side of the center hole 241. One end of the sensor connection busbar 46 defines the electronic component connection portion 463, and is connected with the sensor connection busbar 43. The other end of the sensor connection busbar 46 defines an electronic component connection portion 464, and is exposed on both axial sides of the busbar holder 21 in the through hole 253. The electronic component connection portion 464 is connected with the resistor 71 and the capacitor 72.

The busbar unit 20, having the above-described structure, is connected to the power supply unit through the control unit (not shown), such as the ECU. Specifically, as illustrated in FIG. 7, each of the terminal portions 312, 322, 332, 412, 422, 432, 442, and 452 is connected to the control unit through a lead wire. Here, each of the coil connection busbars 31, 32, and 33 corresponds to a separate one of U, V, and W phases. This allows three-phase electrical currents in accordance with the Hall signals outputted from the Hall ICs 61 to be supplied to the coils 13 through the coil connection busbars 31, 32, and 33.

The assemblage of the busbar unit 20 will now be described below. First, the busbar holder 21, the coil connection busbars 31, 32, and 33, and the sensor connection busbars 41, 42, 43, 44, and 45 are preferably integrally formed by the insert molding, for example.

Next, the sensor connection busbars 51, 52, and 53 are attached to the busbar holder 21. Specifically, the electronic component connection portions 513, 523, and 533 are inserted into the through holes 251, 272, and 273, respectively. In addition, projection portions 225 defined on the upper surface portion 23 of the busbar holder body portion 211 are inserted into holes defined in the sensor connection busbars 51, 52, and 53. The projection portions 225 are subjected to heat welding, i.e., are heated and crushed, so that the sensor connection busbars 51, 52, and 53 are fixed to the busbar holder 21.

Next, each end portion of the conductor wires 130 defining the coils 13 is connected with the conductor wire connection portion 313, 323, or 333 through, for example, Tungsten Inert Gas (TIG) welding.

Now, an example of how the end portions of the conductor wires 130 are welded to the conductor wire connection portion 323 will be described below. FIG. 16 is a diagram illustrating the conductor wire connection portion 323 and the end portions of the conductor wires 130 prior to the welding. FIG. 17 is a diagram illustrating the conductor wire connection portion 323 and the end portions of the conductor wires 130 after the welding.

As illustrated in FIG. 16, while the conductor wires 130 are inserted from the upper side of the busbar holder 21 through the conductor wire connection portion 323, the side wall portions 323a and 323c are bent so as to enclose the conductor wires 130. As a result, the side wall portions 323a, 323b, and 323c and the end portions of the conductor wires 130 are brought into contact with each other. Since the cutout portions 323d (see FIG. 9) are defined in the conductor wire connection portion 323, it is easy to bend the side wall portions 323a and 323c.

Thereafter, a ground electrode and a tungsten electrode used for the TIG welding are inserted into the through hole 262 from the lower side of the busbar holder 21. The tungsten electrode is positioned below the end portions of the conductor wires 130. The ground electrode is brought into contact with a boundary between the conductor wire connection portion 323 and the base portion 321. An arc is created between the tungsten electrode and the end portions of the conductor wires 130 to melt the end portions of the conductor wires 130 and next the side wall portions 323a, 323b, and 323c. As a result, the conductor wire connection portion 323 and the end portions of the conductor wires 130 are welded to each other.

As a result, the conductor wire connection portion 323 and the end portions of the conductor wires 130 are now in a state as illustrated in FIG. 17. Because the conductor wire connection portion 323 is exposed on both axial sides of the busbar holder 21, it is possible to insert the tungsten electrode and the ground electrode from an opposite direction to that from which the conductor wires 130 are inserted. Therefore, it is possible to prevent the conductor wires 130 from coming into contact with the tungsten electrode 74 or the ground electrode 75 at the time of the welding.

The inward bending of the side wall portions 323a and 323c contributes to a reduction in an area of contact between the conductor wire connection portion 323 and the conductor wires 130. This accordingly leads to a reduction in an area where the conductor wire connection portion 323 is melted, making it easier to weld the conductor wires 130 to the conductor wire connection portion 323. In a similar manner, each of the conductor wire connection portions 313 and 333 is connected with the corresponding end portions of the conductor wires 130 through the TIG welding.

Note that the conductor wire connection portion 323 may be connected with the end portions of the conductor wires 130 through, for example, resistance welding. For example, it is possible to weld the end portion of the conductor wire 130 and the side wall portion 323a to each other by placing two electrodes used for the resistance welding in contact with the side wall portion 323a and the end portion of the conductor wire 130, respectively. This method can also be employed to achieve the resistance welding between the side wall portions 323b and 323c and the end portions of the conductor wires 130.

Figure 18:
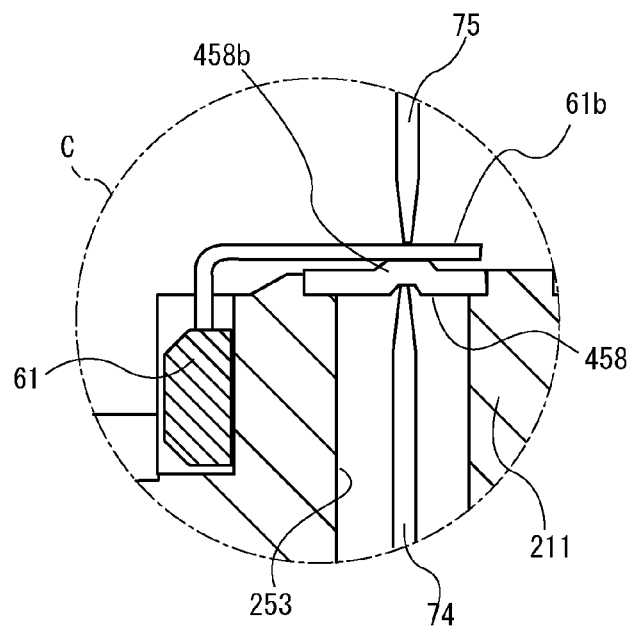
FIG. 18 is a diagram illustrating the state of a terminal of one of the Hall ICs and a sensor connection portion according to a preferred embodiment of the present invention prior to welding.

Next, each Hall IC 61 is arranged in a separate one of the plurality of sensor holders 244. The terminal of each Hall IC 61 is connected with the projection portion of the corresponding sensor connection portion through the resistance welding. FIG. 18 is a diagram illustrating an arrangement of the electrodes 74 and 75 when the sensor connection portion 458 and the ground terminal 61b are welded to each other. Note that FIG. 18 is a figure corresponding to area C indicated in FIG. 6. As illustrated in FIG. 18, the electrode 74 is passed through the through hole 253 from the lower side to come into contact with the projection portion 458b, while the electrode 75 is passed through the through hole 253 from the upper side to come into contact with the ground terminal 61b. An electrical current is applied across the projection portion 458b and the ground terminal 61b to weld the projection portion 458b and the ground terminal 61b to each other. In a similar manner, the terminal of each of the other Hall ICs is welded to the corresponding sensor connection portion. Note that the TIG welding, instead of the resistance welding, may be employed to achieve the welding between each Hall IC and the corresponding sensor connection portion.

As described above, because the sensor connection portion 458 is exposed on both axial sides of the busbar holder 21, it is possible to insert the electrode 74 from an opposite direction to that from which the electrode 75 is inserted. This makes it possible to shorten the distance between the electrodes and 75, across the sensor connection portion 458 and the ground terminal 61b, thereby shortening a path over which the electrical current flows at the time of the welding. In addition, the provision of the projection portion 458b in the sensor connection portion 458 contributes to reducing an area of contact between the sensor connection portion 458 and the ground terminal 61b, and thereby increasing efficiency in the welding operation.

Next, the sensor connection busbar 46, the plurality of resistors 71, and the plurality of capacitors 72 are arranged on the bottom surface portion 22 of the busbar holder body portion 211. Thereafter, the resistors 71 and the capacitors 72 are connected with the corresponding electronic component connection portions through the resistance welding. The busbar unit 20 is assembled in the above-described manner.

FIG. 19 is a diagram illustrating a state of the electronic component connection portion 413 and an end portion of one of the capacitors 72 prior to the welding. Note that FIG. 19 is a radial cross-sectional view of the electronic component connection portion 413, and corresponds to area D indicated in FIG. 6. As illustrated in FIG. 19, the electrodes 74 and 75 are brought from below into contact with the end portion of the capacitor 72 and the electronic component connection portion 413, respectively. An electrical current is applied across the end portion of the capacitor 72 and the projection portion 413b to weld the end portion of the capacitor 72 to the projection portion 413b of the electronic component connection portion 413. The provision of the projection portion 413b in the electronic component connection portion 413 contributes to reducing an area of contact between the electronic component connection portion 413 and the end portion of the capacitor 72, and thereby increasing efficiency in the welding operation. In a similar manner, the electronic component connection portion 413 and one of the resistors 71 are welded to each other. In addition, one of the resistors 71 and one of the capacitors 72 are welded to the electronic component connection portion 423. The electronic component connection portions 433 and 463 are welded to each other.

Also, as described above, the electronic component connection portions 443, 444, 445, 453, 454, 455, and 464 are exposed on both axial sides of the busbar holder 21. Accordingly, each of the electronic component connection portions 443, 444, 445, 453, 454, 455, and 464 is welded to the resistor 71 or the capacitor 72 in a similar manner to that in which the sensor connection portion 458 and the ground terminal 61b are welded to each other. This makes it possible to shorten the distance between the electrodes 74 and 75, across the electronic component connection portion and the electronic component, and thereby to increase efficiency in the welding operation. Note that the TIG welding, instead of the resistance welding, may be employed to achieve the welding between each Hall IC 61 and the corresponding sensor connection portion.

As described above, in the brushless motor 1 according to the present preferred embodiment, the end portions of the conductor wires 130 are connected with the conductor wire connection portions 313, 323, and 333 provided in the coil connection busbars 31, 32, and 33, respectively, by welding. Therefore, even under a high temperature environment, the connection between each of the conductor wire connection portions 313, 323, and 333 and the corresponding end portions of the conductor wires 130 is less likely to become poor than in the case where they were connected together with solder or the like, and the motor is thus capable of operating stably even under the high temperature environment. Also, since each of the conductor wire connection portions 313, 323, and 333 is exposed on both axial sides of the busbar holder 21, the welding operation is easy.

In addition, the electronic component connection portions and the sensor connection portions of the sensor connection busbars 41, 42, 43, 44, 45, 46, 51, 52, and 53 are connected with the terminal of the corresponding Hall IC 61, the corresponding resistor 71, or the corresponding capacitor 72 by welding. Therefore, the motor is capable of operating stably even under the high temperature environment. Furthermore, since some of the electronic component connection portions and the sensor connection portions are exposed on both axial sides of the busbar holder 21, the welding operation is easy.

Note that, although the electronic component connection portions 443, 444, and 445 of the sensor connection busbar 44 and the electronic component connection portions 453, 454, and 455 of the sensor connection busbar 45 are not provided with a projection portion in the present preferred embodiment described above, the present invention is not limited thereto. A projection portion may be defined in any of the aforementioned electronic component connection portions.

Furthermore, although three coil connection busbars each corresponding to one of the U, V, and W phases are provided in the present preferred embodiment described above, the present invention is not limited thereto. The number of coils 13 varies according to the number of slots or the number of phases of the brushless motor, and accordingly, a change may be made to the number of coil connection busbars or conductor wire connection portions according to the present preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A motor arranged to select a gear of a transmission installed in a vehicle or to drive a clutch, the motor comprising:
   a rotor arranged to rotate about a rotation axis;
   a stator core including a plurality of teeth;
   a plurality of coils, each defined by a conductor wire wound around a separate one of the teeth; and
   a busbar unit arranged to supply a drive current to each coil;
   wherein the busbar unit includes:
      a plurality of coil connection busbars, each including a conductor wire connection portion connected with an end portion of the conductor wire;
      a busbar holder made of an insulating material and arranged to support the plurality of coil connection busbars, the busbar holder includes a plurality of sensor holders, each arranged to hold a separate one of a plurality of sensors, the plurality of sensors being arranged to detect a rotational position of the rotor; and
      a plurality of sensor connection busbars housed in the busbar holder and arranged to either supply a drive current to ones of the plurality of sensors held in the respective sensor holders, or to output an output signal from ones of the plurality of sensors;
   each conductor wire connection portion is welded to a corresponding end portion of the conductor wire; and
   at least one of the plurality of sensor connection busbars includes a plurality of sensor connection portions each directly physically and electrically connected with a terminal of a separate one of the plurality of sensors.

2. The motor according to claim 1, wherein the busbar holder includes first through holes passing through the busbar holder in an axial direction, each first through hole being defined at a position corresponding to a separate one of the conductor wire connection portions; and
   each of the conductor wire connection portions is exposed on both axial sides.

3. The motor according to claim 2, wherein each of the sensor connection portions and each of the terminals of the corresponding separate one of the plurality of sensors are welded to each other.

4. The motor according to claim 3, wherein
   the busbar holder includes second through holes passing through the busbar holder in the axial direction, each second through hole being defined at a position corresponding to a separate one of the sensor connection portions; and
   each of the sensor connection portions is exposed on both axial sides.

5. The motor according to claim 3, wherein
   each of the sensor connection busbars includes an electronic component connection portion connected with an end portion of another electronic component other than the plurality of sensors; and
   the electronic component connection portion and the end portion of the another electronic component are welded to each other.

6. The motor according to claim 5, wherein
   each of the electronic component connection portions includes a plane portion perpendicular or substantially perpendicular to the axial direction, and a projection portion raised from the plane portion in the axial direction; and
   the projection portion and the end portion of the another electronic component are welded to each other.

7. The motor according to claim 5, wherein each of the electronic component connection portions is arranged at a position corresponding to one of the first through holes.

8. A motor comprising:
   a rotor arranged to rotate about a rotation axis;
   a stator core including a plurality of teeth;
   a plurality of coils, each defined by a conductor wire wound around a separate one of the teeth; and
   a busbar unit arranged to supply a drive current to each coil;
   wherein the busbar unit includes:
      a plurality of coil connection busbars, each including a conductor wire connection portion connected with an end portion of the conductor wire; and
      a busbar holder made of an insulating material and arranged to support the plurality of coil connection busbars;
   each conductor wire connection portion has a shape substantially similar to a "U" with a groove extending in an axial direction perpendicular or substantially perpendicular to axially upper and axially lower side surfaces of the shape substantially similar to a "U" and parallel or substantially parallel to a bottom surface of the shape substantially similar to a "U" to define the shape substantially similar to a "U", and includes a cutout portion defined in a portion of a side wall of each conductor wire connection portion which has the shape substantially similar to a "U"; and
   a plurality of axially projecting portions are provided on one conductor wire connection portion with the cutout portion of the one conductor wire connection portion being arranged between a pair of the plurality of axially projecting portions on a single one of the axially upper and axially lower side surfaces, one of the plurality of axially projecting portions being positioned on the bottom surface of the shape substantially similar to a "U".

9. The motor according to claim 8, wherein
   the end portion of the conductor wire is inserted from a direction of the stator core along the axial direction such that the end portion of the conductive wire is arranged within the groove defined in the conductor wire connection portion; and
   the cutout portion is arranged to extend along the axial direction.

10. A motor comprising:
a rotor arranged to rotate about a rotation axis;
a stator core including a plurality of teeth;
a plurality of coils, each defined by a conductor wire wound around a separate one of the teeth; and
a busbar unit arranged to supply a drive current to each coil;
wherein the busbar unit includes:
a plurality of coil connection busbars, each including a conductor wire connection portion connected with an end portion of the conductor wire; and
a busbar holder made of an insulating material and arranged to support the plurality of coil connection busbars;
each conductor wire connection portion includes an axial side wall substantially similar to a "U" when observed in an axial direction and further includes a cutout portion defined in a portion of an axially upper surface of the axial side wall; and
a plurality of axially projecting portions are provided on one conductor wire connection portion with the cutout portion of the one conductor wire connection portion being arranged between a pair of the plurality of axially projecting portions, one of the plurality of axially projecting portions being positioned on a bottom portion of the axial side wall substantially similar to a "U".

11. The motor according to claim 10, wherein
the end portion of the conductor wire is inserted from a direction of the stator core along the axial direction such that the end portion of the conductive wire is arranged to be surrounded by the axial side wall of the conductor wire connection portion; and
the cutout portion is arranged to extend along the axial direction.

12. The motor according to claim 10, wherein
the busbar holder includes first through holes passing through the busbar holder in the axial direction, each first through hole being defined at a position corresponding to a separate one of the conductor wire connection portions; and
each conductor wire connection portion is exposed on both axial sides.

13. The motor according to claim 12, wherein
the busbar holder includes a plurality of sensor holders, each arranged to hold a separate one of a plurality of sensors, the plurality of sensors being arranged to detect a rotational position of the rotor;
the busbar unit further includes a plurality of sensor connection busbars arranged to either supply a drive current to ones of the plurality of sensors held in the respective sensor holders, or to output an output signal from the plurality of sensors;
the busbar holder is arranged to support the plurality of sensor connection busbars;
at least one of the plurality of sensor connection busbars includes sensor connection portions each directly connected with a terminal of a separate one of the plurality of sensors; and
each of the sensor connection portion and the terminal of a corresponding one of the plurality of sensors are welded to each other.

14. The motor according to claim 13, wherein
the busbar holder includes second through holes passing through the busbar holder in the axial direction, each second through hole being defined at a position corresponding to a separate one of the sensor connection portions; and
each of the sensor connection portions is exposed on both axial sides.

15. The motor according to claim 13, wherein
each of the sensor connection busbars includes an electronic component connection portion connected with an end portion of another electronic component than the plurality of sensors; and
the electronic component connection portion and the end portion of the another electronic component are welded to each other.

16. The motor according to claim 15, wherein
each of the electronic component connection portions includes a plane portion perpendicular or substantially perpendicular to the axial direction, and a projection portion raised from the plane portion in the axial direction; and
the projection portion and the end portion of the another electronic component are welded to each other.

17. The motor according to claim 15, wherein each of the another electronic component connection portions is arranged at a position corresponding to one of the first through holes.

* * * * *